Sept. 16, 1958 E. O. LAWRENCE 2,852,690
CALUTRONS
Filed Nov. 29, 1945 3 Sheets-Sheet 2

INVENTOR.
ERNEST O. LAWRENCE
BY
ATTORNEY

INVENTOR.
ERNEST O. LAWRENCE
BY
ATTORNEY

United States Patent Office 2,852,690
Patented Sept. 16, 1958

2,852,690
CALUTRONS

Ernest O. Lawrence, Berkeley, Calif., assignor to the United States of America as represented by the United States Atomic Energy Commission Application November 29, 1945, Serial No. 631,727

25 Claims. (Cl. 250—41.9)

The present invention relates to calutrons and more particularly to improvements in calutrons of the character disclosed in the United States Patent No. 2,709,222, issued May 24, 1955, to Ernest O. Lawrence.

At the outset, it is noted that a "calutron" is a machine of the character of that disclosed in the above-mentioned Lawrence patent, and is employed to separate the constituent isotopes of an element and, more particularly, to increase the proportion of a selected isotope in an element containing several isotopes in order to produce the element enriched with the selected isotope. For example, the machine is especially useful in producing uranium enriched with $U^{235}$.

Such a calutron essentially comprises means for vaporizing a quantity of material containing an element that is to be enriched with a selected one of its several isotopes; means for subjecting the vapor to ionization, whereby at least a portion of the vapor is ionized causing ions of the several isotopes of the element to be produced; electrical means for segregating the ions from the un-ionized vapor and for accelerating the segregated ions to relatively high velocities; electromagnetic means for deflecting the ions along curved paths, the radii of curvature of the paths of the ions being proportional to the square roots of the masses of the ions, whereby the ions are concentrated in accordance with their masses; and means for deionizing and collecting the ions of the selected isotope thus concentrated, thereby to produce a deposit of the element enriched with the selected isotope.

It is an object of the present invention to effect economies in space and material by providing a calutron comprising a tank, and magnetic field structure including windings surrounding the tank.

It is a further object of the present invention to provide a calutron comprising a generally cylindrical tank having magnet windings surrounding said tank.

It is a further object of the present invention to provide a calutron comprising a generally cylindrical tank having an axially disposed, removable supporting member carrying ion separating mechanism.

It is a further object of the present invention to provide a calutron comprising a generally cylindrical tank containing a plurality of ion separating mechanisms, and removable supporting means for removing or replacing all of said mechanisms simultaneously.

It is a further object of the present invention to provide a calutron comprising an elongated tubular tank, a pair of trackways in said tank, and groups of beam transmitters and receivers respectively movable on said trackways.

The invention, both as to its organization and method of operation, together with further objects and advantages thereof, will best be understood by reference to the following specification taken in connection with the accompanying drawings, in which.

Figure 1:
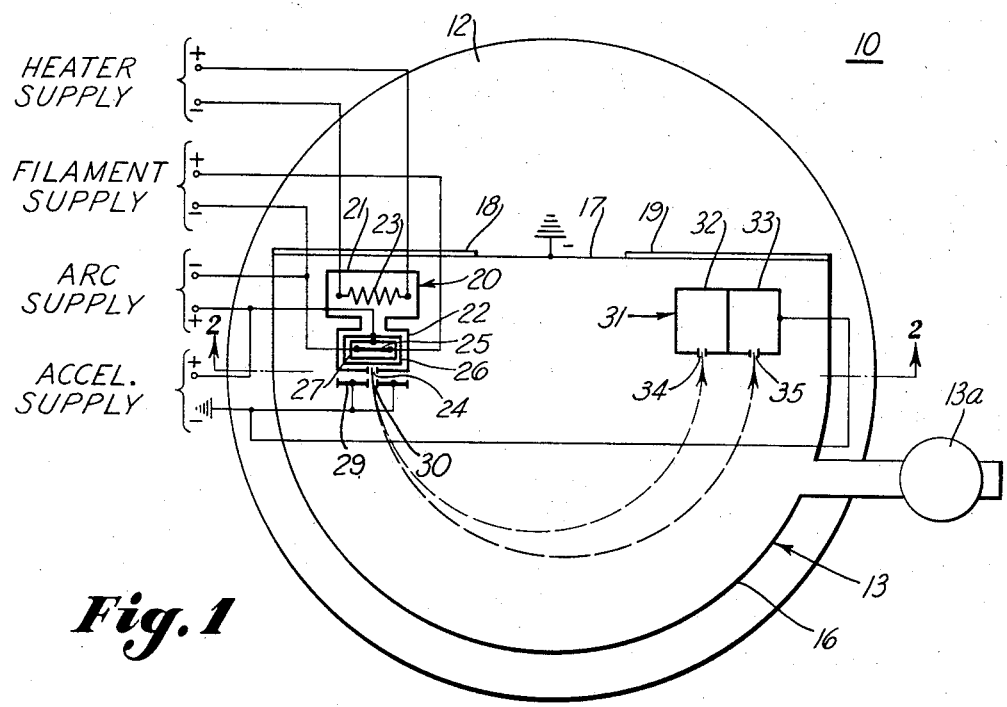
Figure 1 is a diagrammatic plan view of a representative calutron.
Figure 2:
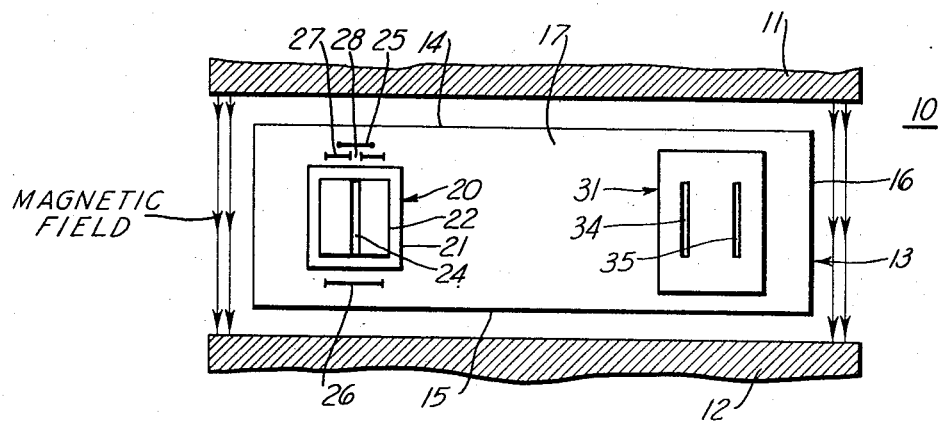
Fig. 2 is a diagrammatic sectional view of the calutron taken along the line 2—2 in Fig. 1.

Referring now more particularly to Figs. 1 and 2 of the drawings, there is illustrated a representative calutron 10 of the character noted, which comprises magnetic field structure including upper and lower polepieces 11 and 12, provided with substantially parallel spaced-apart pole faces, and a tank 13 disposed between the pole faces of the pole pieces 11 and 12. The pole pieces 11 and 12 carry windings, not shown, which are adapted to be energized in order to produce a substantially uniform and relatively strong magnetic field therebetween, which magnetic field passes through the tank 13 and the various parts housed therein. The tank 13 is generally flat, being substantially D-shaped in plan, and comprising substantially flat parallel top and bottom walls 14 and 15, a curved outer side wall 16, and a flat, rectangular side wall 17. Side wall 17 has openings therein provided with removable panels 18 and 19 adapted to be hermetically sealed thereover. Also, vacuum pumping apparatus 13a is associated with the tank 13, whereby the interior of the tank 13 may be evacuated to a pressure of the order of $10^{-5}$ to $10^{-4}$ mm. Hg. The top and bottom walls 14 and 15 of the tank 13 are spaced a short distance from the pole faces of the upper and lower pole pieces 11 and 12 respectively, the tank 13 being retained in such position in any suitable manner, whereby the top and bottom walls 14 and 15 constitute in effect pole pieces with respect to the interior of the tank 13, as explained more fully hereinafter.

The ion beam transmitting unit 20 and the cooperating receiver unit 31 are collectively referred to herein as electromagnetic ion separating mechanism, or more generally simply as ion separating mechanism.

The removable panel 18 suitably supports the ion beam transmitting unit 20 comprising a charge receptacle 21, a communicating arc block 22 and ion accelerating structure 29. An electric heater 23 is arranged in heat exchange relation with the charge receptacle 21 and is adapted to be connected to a suitable source of heater supply, whereby the charge receptacle 21 may be appropriately heated, the charge receptacle 21 being formed of stainless steel or the like. The arc block 22 is formed, at least partially, of brass or the like and is substantially C-shaped in plan, an upstanding slot 24 being formed in the wall thereof remote from the charge receptacle 21. Thus, the arc block 22 is of hollow construction, the cavity therein communicating with the interior of the charge receptacle 21.

Also, the removable panel 18 carries a filamentary cathode 25 adapted to be connected to a suitable source of filament supply, the filamentary cathode 25 overhanging the upper end of the arc block 22 and arranged in alignment with respect to the upper end of the cavity formed therein. The arc block 22 carries an anode 26 disposed adjacent the lower end thereof and arranged in alignment with respect to the cavity formed therein. Also, the arc block 22 carries a collimating electrode 27 disposed adjacent the upper end thereof and having an elongated collimating slot 28 formed therethrough and arranged in alignment with respect to the filamentary cathode 25 as well as the anode 26 and the cavity formed in the arc block 22. Both the anode 26 and the collimating electrode 27 are electrically connected to the arc block 22, which in turn is connected to the positive terminal of a suitable source of accelerating electrode supply, as explained more fully hereinafter. On the other hand, the tank 13 is grounded. Also, the filamentary cathode 25 and the cooperating anode 26 are adapted to be connected to a suitable source of arc supply.

Further, the removable panel 18 carries ion accelerating structure 29, formed at least partially of tungsten, carbon, or the like, and disposed in spaced-apart relation with respect to the wall of the arc block 22 in which the slot 24 is formed. More specifically, a slit 30 is formed in the ion accelerating structure 29 and arranged in substatial alignment with respect to the slot 24 formed in the wall of the arc block 22. The source of accelerating electrode supply is connected between the arc block 22 and the ion accelerating structure 29, the positive and negative terminals of the supply mentioned being respectively connected to the arc block 22 and to the ion accelerating structure 29. Further, the negative terminal of the ion accelerating electrode supply is grounded.

The removable panel 19 suitably supports an ion receiver or collector block 31 formed of stainless steel or the like, and provided with two laterally spaced-apart cavities or pockets 32 and 33 which respectively communicate with aligned slots 34 and 35 formed in the wall of the collector block 31 disposed remote from the removable panel 19. It is noted that the pockets 32 and 33 are adapted to receive two constituent isotopes of an element which have been separated in the calutron 10, as explained more fully hereinafter. Finally, the collector block 31 is electrically connected to the ion accelerating structure 29. Thus it will be understood that the source unit 20 is connected to the positive ungrounded terminal of the accelerating electrode supply; while the ion accelerating structure 29 and the collector block 31 are connected to the negative grounded terminal of the accelerating electrode supply; the source unit 20 being electrically insulated from the component parts of the tank 13. Thus the portion of the tank 13 disposed between the ion accelerating structure 29 and the collector block 31 constitutes an electrostatic shield for the high-velocity ions traversing the curved paths between the slit 30 formed in the ion accelerating structure 29 and the slots 34 and 35 formed in the collector block 31, as explained more fully hereinafter.

Considering now the general principle of operation of the calutron 10, a charge comprising a compound of the element to be treated is placed in the charge receptacle 21, the compound of the element mentioned being one which may be readily vaporized. The panels 18 and 19 are securely attached to the end wall 17, whereby the tank 13 is hermetically sealed. The various electrical connections are completed and operation of the vacuum pumping apparatus 13a associated with the tank 13 is initiated. When a pressure of the order of $10^{-5}$ to $10^{-4}$ mm. Hg is established within the tank 13, the electric circuits for the windings, not shown, associated with the pole pieces 11 and 12 are closed and adjusted, whereby a predetermined magnetic field is established therebetween traversing the tank 13. The electric circuit for the heater 23 is closed, whereby the charge in the charge receptacle 21 is heated and vaporized. The vapor fills the charge receptacle 21 and is conducted into the communicating cavity formed in the arc block 22. The electric circuit for the filamentary cathode 25 is closed, whereby the filamentary cathode is heated and rendered electron emissive. Then the electric circuit between the filamentary cathode 25 and the anode 26 is closed, whereby an arc discharge is struck therebetween, electrons proceeding from the filamentary cathode 25 through the collimating slot 28 formed in the collimating electrode 27 to the anode 26. The collimating slot 28 formed in the collimating electrode 27 defines the cross section of the stream of electrons proceeding into the arc block 22, whereby the arc discharge has a ribbon-like configuration and breaks up the molecular form of the compound of the vapor to a considerable extent, producing positive ions of the element that is to be enriched with the selected one of its isotopes.

The electric circuit between the arc block 22 and the ion accelerating structure 29 is completed, the ion accelerating structure 29 being at a high negative potential with respect to the arc block 22, whereby the positive ions in the arc block 22 are attracted by the ion accelerating structure 29 and accelerated through the voltage impressed therebetween. More particularly, the positive ions proceed from the cavity formed in the arc block 22 through the slot 24 formed in the wall thereof, and across the space between the ion accelerating structure 29 and the adjacent wall of the arc block 22, and thence through the slit 30 formed in the ion accelerating structure 29. The high-velocity positive ions form a vertical upstanding ribbon or beam proceeding from the cavity formed in the arc block 22 through the slot 24 and the aligned slit 30.

As previously noted, the collector block 31, the tank 13, and the ion accelerating structure 29 are all at ground potential, whereby there is an electric-field-free path for the high-velocity positive ions disposed between the ion accelerating structure 29 and the collector block 31 within the tank 13. The high-velocity positive ions are deflected from their normal straight-line path and from a vertical plane passing through the slot 24 and the aligned slit 30, due to the effect of the relatively strong magnetic field maintained through the space within the tank 13 through which the positive ions travel, whereby the positive ions describe arcs, the radii of which are proportional to the square roots of the masses of the ions and consequently of the isotopes of the element mentioned. Thus, ions of the relatively light isotope of the element describe an interior arc of relatively short radius and are focused through the slot 34 into the pocket 32 formed in the collector block 31; whereas ions of the relatively heavy isotope of the element describe an exterior arc of relatively long radius and are focused through the slot 35 into the pocket 33 formed in the collector block 31. Accordingly, the ions of the relatively light isotope of the element are collected in the pocket 32 and are deionized to produce a deposit of the relatively light isotope of the element therein; while the ions of the relatively heavy isotope of the element are collected in the pocket 33 and are deionized to produce a deposit of the relatively heavy isotope of the element therein.

After all of the charge in the charge receptacle 21 has been vaporized, all of the electric circuits are interrupted and the panel 18 is removed so that another charge may be placed in the charge receptacle 21 and subsequently vaporized in the manner explained above. After a suitable number of charges have been vaporized in order to obtain appropriate deposits of the isotope of the element in the pockets 32 and 33 of the collector block 31, the panel 19 is removed and the deposits of the collected isotopes in the pockets 32 and 33 in the collector block 31 are reclaimed.

It will be appreciated that while I have illustrated the potential difference between the arc block 22 and accelerating structure 29 as resulting from a high positive potential applied to the arc block while the accelerating structure is grounded, it is equally feasible to ground the arc block 22, and to apply a high negative potential to the accelerating structure 29. In this case, the collector block 31 is similarly connected to the source of negative potential applied to the accelerating structure, and a shielding liner, at the same negative potential, surrounds the ion arc.

Of course, it will be understood that the various dimensions of the parts of the calutron 10, the various electrical potentials applied between the various electrical parts thereof, as well as the strength of the magnetic field between the pole pieces 11 and 12, are suitably correlated with respect to each other, depending upon the mass numbers of the several isotopes of the element which is to be treated therein. In this connection reference is again made to the patent to Ernest O. Lawrence, for a complete specification of a calutron especially designed for the production of uranium enriched with the isotope $U^{235}$. By way of illustration, it is noted that when the calutron 10 is employed in order to produce uranium enriched with $U^{235}$, the compound of uranium which is suggested as a suitable charge in the charge receptacle 21 is $UCl_4$, as this compound may be readily vaporized and the molecular form of the vapor may be readily broken up to form positive ions of uranium with great facility. In this case, uranium enriched with $U^{235}$ is collected in the pocket 32 of the collector block 31, and uranium comprising principally $U^{238}$ is collected in the pocket 33 of the collector block 31. Also, it is noted that from a practical standpoint, the deposit of uranium collected in the pocket 32 of the collector block 31 contains considerable amounts of $U^{238}$, in view of the fact that this isotope comprises the dominant constituent of normal uranium. Furthermore, the deposit of uranium collected in the pocket 32 of the collector block 31 contains a considerably increased amount of $U^{234}$, in view of the fact that it is not ordinarily feasible to separate $U^{234}$ and $U^{235}$ in the production of relatively large quantities of uranium enriched with $U^{235}$ for commercial purposes. Accordingly, in this example the uranium deposited in the pocket 32 of the collector block 31 is considerably enriched, both with $U^{234}$ and $U^{235}$, and considerably impoverished with respect to $U^{238}$ as compared to natural or normal uranium.

Figure 3:
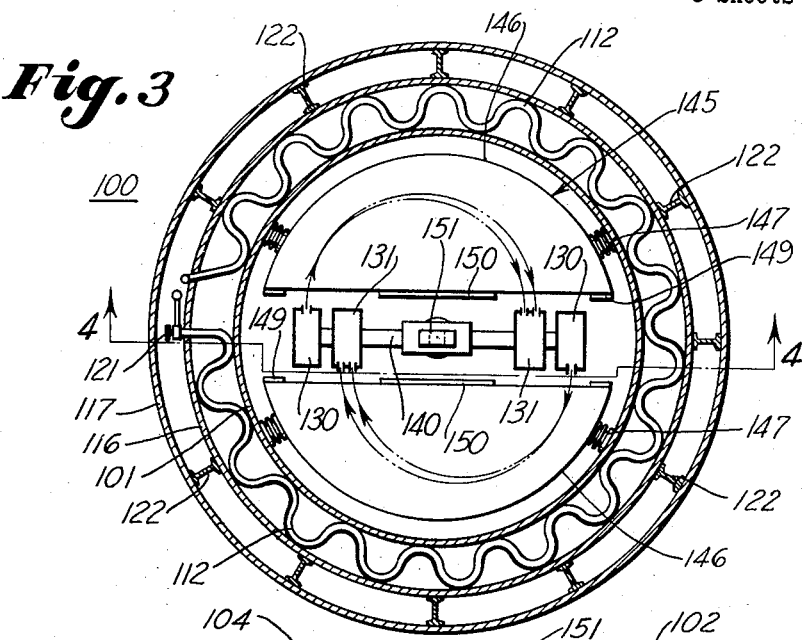
Fig. 3 is a horizontal section through a vertically disposed, tubular calutron tank, substantially on the line 3—3 in Fig. 4.
Figure 4:
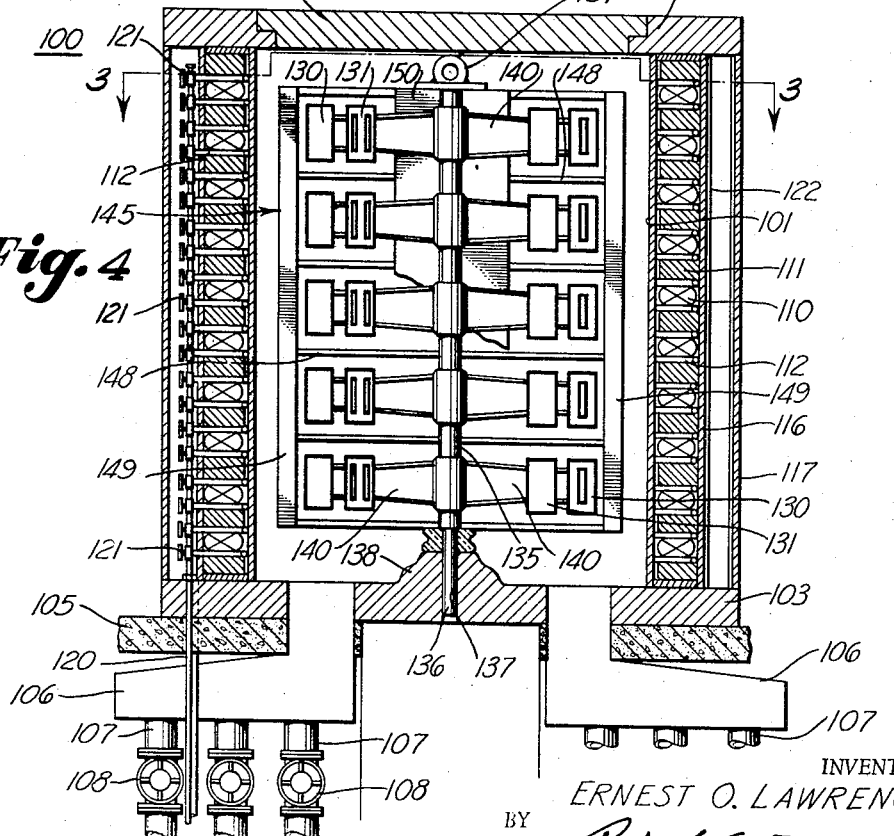
Fig. 4 is a section on the line 4—4 in Fig. 3.

Referring now to Figs. 3 and 4, I have illustrated generally at 100 a calutron tank comprising a substantially cylindrical side wall 101, a relatively thick top wall 102, and a relatively thick bottom wall 103, the top and bottom walls 102 and 103 being formed of a material having a high magnetic permeability, for a purpose later to appear. The top wall 102 has a removable circular section 104 which affords access to the interior of the tank.

As illustrated in Fig. 4, the calutron tank rests upon a supporting foundation 105 which may be the floor of the building, and has depending vacuum manifolds 106, each of which is connected through conduits 107, controlled by valves 108, to a diffusion pump not illustrated. Manifolds 106 extend through the supporting foundation 105 to the space therebeneath.

Magnetic field means are provided for establishing a magnetic field longitudinally through the tank. The magnetic field means comprises a plurality of structurally independent, but electrically connected, coils 110, annular, nonmagnetic spacers 111, and coolant conduits 112 arranged in heat transfer relationship between each of the coils 110 and the adjacent spacers 111. The coils 110, the spacers 111, and cooling conduits 112 together comprise windings for energizing the magnetic field means. It will be observed that the windings surround and extend completely along the length of the cylindrical shell 101 of the calutron tank. This arrangement provides for a maximum effectiveness of the magnetic windings. The relatively thick top and bottom tank walls 102 and 103 serve as flux distributing pole pieces, as will be apparent.

A cylindrical shell 116 is provided around the outside of the windings, including the coils 110, and cooperates with the cylindrical tank shell 101 to provide an annular space in which the magnet windings are contained. These windings may be arranged to provide passages therethrough for the circulation of cooling oil, in a manner well known to the art. However, since the winding structure is located within a second annular shell 117, it is desirable to provide additional cooling means for removing heat from the circulating oil where such is provided. It is for this purpose that the cooling conduits 112, previously referred to, are provided, and it will be appreciated that these may be operated either to remove heat from a cooling oil circulating through the windings, where such is employed; or, in the event that no cooling oil is provided, the conduits 112 may serve as the sole cooling means for the windings. A header 120 is provided, and each of the conduit sections 112 lying adjacent to a side of the magnet coil 110 is connected thereto through independently operable valves 121.

In order to provide a return path for the magnetic flux set up by the magnet windings, a plurality of beams 122 is provided. The beams 122 form a closed magnetic circuit for the magnetic flux set up by the windings. It will be appreciated that the number of beams 122 provided will depend upon the strength of the field, and they will be provided in sufficient number so that they can carry the magnetic flux without approaching saturation. The circular shell 117 previously referred to serves as an outer enclosure for the beams 122, and cooperates with the shell 116 previously referred to to provide an annular space in which the beams are contained.

From the foregoing description of the magnetic field mechanism, it will be appreciated that by energizing the winding of the coils 110 a magnetic field may be set up which extends longitudinally through the tank is a desired direction. In the embodiment illustrated, it is assumed that the magnetic flux extends upwardly, or in other words that the bottom pole 103 is a north pole. The flux then extends upwardly between the plates 103 and 102 in substantial uniformity throughout the tank, this uniformity resulting from the fact that the tank bottom and top 103 and 102 are relatively thick pieces having a high magnetic permeability, and the flux returns downwardly through the beams 122.

Inside the tank 100 is provided ion separating mechanism comprising a plurality of pairs of ion beam transmitters 130 and receivers 131. In the present case, it is sufficient to note that the ion beam transmitter comprises electrical means for projecting a beam of positive ions in a direction transverse to a magnetic field. The beam of positive ions thus projected transverse to the magnetic field is caused thereby to follow an arcuate path with a resulting separation of ions of different mass, as fully described in the patent identified above. Following a predetermined passage of the beam, it is caused to fall upon a receiver having a pair of pockets for receiving portions of the beam formed by ions of different masses.

In accordance with the present invention, the ion separating mechanism is supported by a vertical stanchion 135 which has a reduced lower portion 136 adapted to seat in a recess 137 formed in an interior boss 138 on the bottom wall 103 of the tank 100. The stanchion 135 has a plurality of arms 140 arranged in oppositely extending, radially disposed pairs. Each of the arms 140 carries adjacent its outer end a transmitter 130 and a receiver 131. As illustrated in Fig. 3, the transmitter 130 is located at the outer end of the arm and the receiver 131 is located closely adjacent to but radially inward from the transmitter 130. If desired, this relationship may be reversed. The transmitter 130 and the receiver 131 carried by a single arm 140 are oppositely disposed in the sense that the openings therein face in opposite directions. As a result of the foregoing arrangement, the ion transmitter carried by one arm 140 transmits a beam which is received by the receiver carried by the opposite arm 140, and beams are provided substantially in the plane of a pair of radially disposed arms 140 which extend around opposite segments of the tank 100. This arrangement provides for a maximum utilization of the space in the tank.

As more fully discussed in my prior Patent No.

2,709,222, the transmitters may be divided into two types, in one of which the positive ions are accelerated by a pair of electrodes carried at a high negative potential with respect to the remainder of the transmitting mechanism. In the other type of transmitter, and as illustrated in Figs. 1 and 2, the accelerating electrodes are carried at ground potential while the remainder of the transmitter is carried at a high positive potential. In the first type of transmitter, it is necessary to provide a shield for the beam between the transmitter and its cooperating receiver, so as to maintain the beam in a substantially field-free zone. In the embodiment illustrated in Figs. 3 and 4, it is assumed that the transmitters are of the type in which the accelerating electrodes are carried at a high negative potential with respect to the remainder of the transmitter, which is grounded. It is therefore necessary to provide shielding means which I have illustrated generally at 145. The shielding structure 145 comprises a segmental, cylindrical shell portion 146, suitably supported from the cylindrical tank wall 101 by insulators 147. The shell 146 is provided with a plurality of shelf-like, horizontal partitions 148, arranged to define partially enclosed spaces defined by adjacent pairs of partitions 148 and the portion of the shell 146 extending therebetween. In addition, the inner or open side of the shielding structure is provided with a pair of vertically extending strips 149, located at the lateral edges of the openings into the shielding structure, and a relatively wide strip 150 extending vertically along the center of the openings into the shielding structure. Thus, each of the beams extending between a transmitter and a receiver is projected into a substantially closed, electric-field-free space defined by a pair of adjacent partitions 148, an outer closing portion of the shell 146, and the portions of the strips 149 and 150 interconnecting the adjacent partitions 148.

As more fully described in my previous patent identified above, it will be understood that the shielding structure 145 is carried at the same high negative potential as the accelerating electrodes associated with the transmitter 130, and further that the cooperating receiver 131 is likewise carried at the same high negative potential. As a result of this, the beam extending between the transmitter and its cooperating receiver extends through a substantially electric-field-free zone.

As previously mentioned, the upper end 102 of the tank 100 is provided with a removable section 104 which affords access to the interior of the tank. When it is necessary to remove the ion separating mechanism for servicing, the section 104 of the plate 102 is removed and the stanchion 135 may be moved vertically upward by conventional hoisting mechanism. For this purpose, an eye 151 is provided at the top of the stanchion 135.

It will be appreciated that the foregoing construction provides for a high concentration of ion separating mechanisms in a given space. This is important for two reasons. In the first place, the ion separating operation is carried out at very low pressures, pressures on the order of $10^{-4}$ to $10^{-5}$ mm. Hg being employed; in order to evacuate a relatively large space to pressures of this order it is necessary to carry on the pumping operation for a very long period of time. In the second place, the apparatus illustrated is relatively massive, ion beams having a radius on the order of four feet being common. Accordingly, the tank structure and the magnet structure must be relatively massive, and economies resulting from the provision of a large number of ion separating mechanisms in a single tank are obvious.

Figure 5:
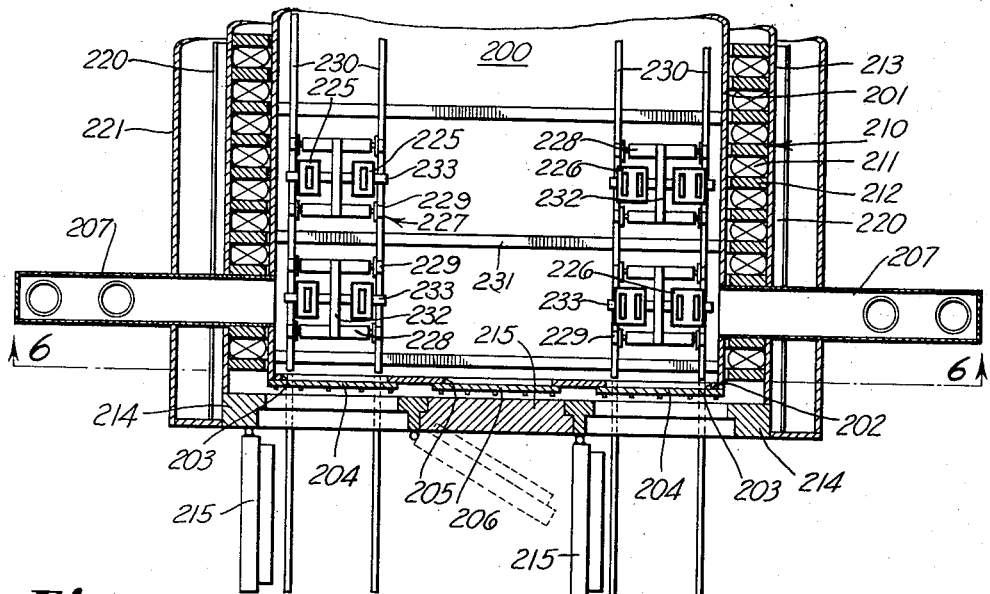
Fig. 5 is a horizontal section through a horizontally disposed tubular calutron tank, substantially on the line 5—5 in Fig. 6.
Figure 6:
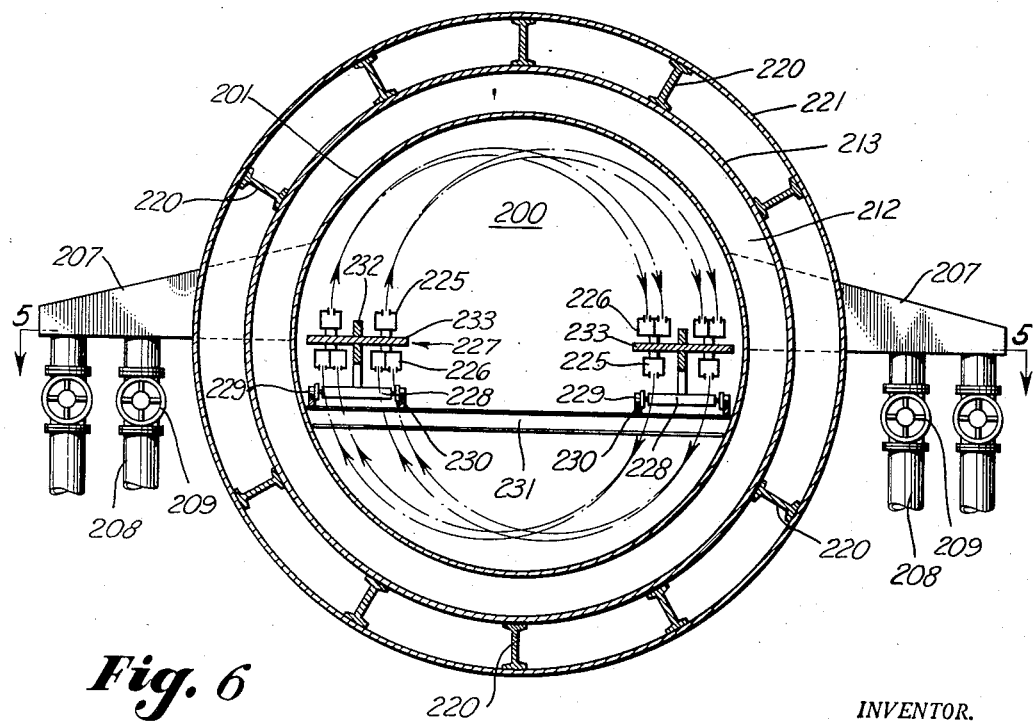
Fig. 6 is a section on the line 6—6 in Fig. 5.

In Figs. 5 and 6 I have illustrated a somewhat different embodiment of my invention, which, however has many of the same advantages. In this embodiment I have illustrated generally at 200 a generally cylindrical, horizontal, substantially fluid-tight tank having a cylindrical side wall 201 and a circular front wall 202. The tank 200 may be of substantial length, and I have illustrated in Fig. 5 only one end thereof. It will be appreciated that the other end of the tank 200 may be closed by a circular wall substantially similar to the wall 202, except that access doors may not be provided. The wall 202 is illustrated as provided with a pair of access openings 203, closed by removable panels 204 for affording access to the ion separating mechanism, and a third opening 205 closed by a removable panel 206 serving as a manhole for entrance to the interior of the tank 200. With the panels 204 and 206 in place, the tank 200 is a substantially fluid-tight vessel, and may be evacuated through manifolds 207 which communicate through conduits 208, controlled by valves 209, with a plurality of diffusion pumps, not shown. It will be appreciated that while in Fig. 5 I have shown only a pair of oppositely disposed manifolds 207, further pairs may be provided as rendered necessary by the length of tank employed.

Magnetic field means are provided for establishing a substantially uniform magnetic field extending longitudinally through the tank 200. The magnetic field means comprises windings, indicated generally at 210, composed of separated, but electrically connected, coils 211 and interposed annular, nonmagnetic spacers 212. The windings 210 are enclosed in an annular space formed between the tank wall 201 and a second cylindrical shell 213. If desired, cooling oil may be circulated through the windings, in a manner well known in the art, in the space between the cylindrical shells 201 and 213.

In order to provide for a substantially uniform distribution of magnetic flux throughout the interior of the tank 200, I have provided a pair of pole pieces at each end thereof, one of the pole pieces being illustrated at 214 as comprised of relatively thick material having a high magnetic permeability. In order to provide access to the ion separating mechanism and to the center access panel 206, the pole member 214 is provided with three hinged doors 215, each in alignment with one of the removable panels 204 or 205. When the magnet is in use, the doors 215 are in closed position so that the pole member 214 is a substantially unbroken, uniform, circular body. In order to provide a path for return flux, a plurality of beams 220 are provided which extend generally parallel to the tank 200, and interconnect the end pole pieces 214. It will be appreciated that a sufficient number of the beams 220 are provided so that they may carry substantially all of the magnetic flux set up without approaching saturation. The beams 220 are received within an annular chamber formed between the shell 213 previously referred to and an outer enclosing shell 221.

It will be appreciated that when the windings 210 are energized, a magnetic flux is set up in the interior of the tank 200, and that this flux is distributed substantially uniformly by the pole pieces, which in turn are connected by the beams 220, thus forming a closed magnetic circuit exterior of the tank.

Ion separating mechanism is provided in the interior of the tank. The ion separating mechanism takes the form of a plurality of beam transmitters 225 and receivers 226. As illustrated, I have provided a plurality of carriages 227 comprising a base 228 provided with wheels 229 adapted to move on trackways 230. The trackways 230 are supported by a plurality of transverse beams 231 which are spaced apart, as indicated in Fig. 5, so as to avoid interference with the ion beams. Extending upwardly from the base 228 of each carriage is a vertical plate 232 to which is secured a horizontally extending bar 233. As best seen in Fig. 6, the bar 233 carries a pair of transmitters 225 and a pair of receivers 226. The pair of transmitters 225 are disposed in side-by-side relationship and are adapted to transmit ion beams which cross in the tank, as illustrated, and are received in a pair of receivers located substantially diametrically opposite to the said pair of transmitters. Furthermore, each of the bars 233 carries a pair of receivers 226 which are oppositely directed with respect to the transmitters 225 carried thereby. As a result of the foregoing description, a pair of carriages 227 carries ion separating mechanism adapted to transmit four ion beams arranged in two crossing pairs, each pair of which occupies a substantially semi-cylindrical segment of the tank.

It will be observed that the embodiment of my invention illustrated in Figs. 5 and 6 is not provided with a shield for the ion beams, or in other words that this embodiment employs the type of transmitter in which the electrodes which accelerate the ion beam from the transmitter are carried at group potential. It will be appreciated, however, that if desired the other type of transmitter, namely that in which the accelerating electrodes are carried at a high negative potential, may be employed, in which case shielding structure similar to that shown in the embodiment illustrated in Figs. 3 and 4 may be employed. Conversely, the structural arrangement of parts illustrated in Figs. 3 and 4 may be employed with a transmitter of the type in which the accelerating electrodes are carried at ground potential, so that the shielding structure illustrated in these figures may be omitted.

While I have illustrated and described in considerable detail two preferred calutrons, it will be appreciated that this has been done solely to enable those skilled in the art to practice the present invention, the scope of which is indicated in the appended claims.

What is claimed is:

1. A calutron comprising an elongated substantially fluid-tight cylindrical tank, magnetic field structure surrounding the elongated portion of said tank including coils for establishing an axial magnetic field therethrough, means for evacuating said tank, ion separating mechanism comprising a plurality of pairs of ion beam transmitters and receivers in said tank, said pairs being spaced apart longitudinally of said magnetic field and the individual transmitter and receiver of a single pair being spaced apart transversely of said magnetic field.

2. A calutron comprising an elongated substantially fluid-tight cylindrical tank, magnetic field structure surrounding the elongated portion of said tank including coils for establishing an axial magnetic field therethrough, means for evacuating said tank, ion separating mechanism comprising a plurality of groups of pairs of ion beam transmitters and receivers removably mounted in said tank, each of said groups comprising a series of pairs spaced apart longitudinally of said magnetic field, the individual transmitter and receiver of each pair being spaced apart transversely of said magnetic field.

3. A calutron comprising an elongated generally cylindrical substantially fluid-tight tank, means for evacuating said tank, magnetic field structure surrounding the elongated portion of said tank and including coils for establishing a magnetic field longitudinally through said tank, electromagnetic ion separating mechanism in said tank comprising a plurality of pairs of ion beam transmitters and receivers adapted to establish ion beams curved through an arc of substantially 180° therebetween, and support means disposing said transmitters and receivers removably within and substantially adjacent the walls of said tank.

4. A calutron comprising a generally cylindrical substantially fluid-tight tank, means for evacuating said tank, magnetic field structure surrounding said tank and including coils for establishing a magnetic field longitudinally through said tank, electromagnetic ion separating mechanism in said tank comprising a plurality of pairs of ion beam transmitters and receivers adapted to establish ion beams curved through an arc of substantially 180° therebetween, and support means disposing said transmitters and receivers removably within and substantially adjacent the walls of said tank, said pairs of transmitters and receivers being spaced longitudinally along said tank.

5. A calutron comprising a generally cylindrical substantially fluid-tight tank, means for evacuating said tank, magnetic field structure surrounding said tank and including coils for establishing a magnetic field longitudinally through said tank, electromagnetic ion separating mechanism in said tank comprising a plurality of pairs of ion beam transmitters and receivers adapted to establish ion beams curved through an arc of substantially 180° therebetween, said pairs of transmitters and receivers being removably arranged in two aligned groups, the transmitters and receivers of one group being respectively adjacent the receivers and transmitters of the other group, whereby the transmitters, the receivers and the ion beams therebetween of each group occupy substantially a longitudinally divided half of said tank.

6. A calutron comprising a generally cylindrical, substantially fluid-tight tank, means for evacuating said tank, means for establishing a magnetic field longitudinally through said tank, electromagnetic ion separating mechanism comprising a beam transmitter and receiver in said tank, and supporting means for said separating mechanism comprising a removable member extending axially of said tank.

7. A calutron comprising a generally cylindrical, substantially fluid-tight tank, means for evacuating said tank, means for establishing a magnetic field longitudinally through said tank, electromagnetic ion separting mechanism comprising a beam transmitter and receiver in said tank, supporting means for said separating mechanism comprising a removable member extending axially of said tank, and oppositely disposed radial arms carrying said transmitter and receiver respectively.

8. A calutron comprising a vertically disposed, generally cylindrical, substantially fluid-tight tank, means for evacuating said tank, means for establishing a magnetic field longitudinally through said tank, electromagnetic ion separating mechanism comprising a beam transmitter and receiver in said tank, and supporting means for said separating mechanism comprising a removable member extending axially of said tank.

9. A calutron comprising a vertically disposed, generally cylindrical, substantially fluid-tight tank, means for evacuating said tank, means for establishing a magnetic field longitudinally through said tank, electromagnetic ion separating mechanism comprising a beam transmitter and receiver in said tank, and supporting means for said separating mechanism comprising a removable member extending axially of said tank, the top wall of said tank having a removable portion to afford access to the interior of said tank.

10. A calutron comprising a vertically disposed, generally cylindrical, substantially fluid-tight tank, means for evacuating said tank, means for establishing a magnetic field longitudinally through said tank comprising windings surrounding said tank, electromagnetic ion separating mechanism comprising a beam transmitter and receiver in said tank, and supporting means for said separating mechanism comprising a removable member extending axially of said tank, the top wall of said tank having a removable portion to afford access to the interior of said tank.

11. A calutron comprising a vertically disposed, generally cylindrical, substantially fluid-tight tank, means for evacuating said tank, means for establishing a magnetic field longitudinally through said tank comprising windings surrounding said tank, electromagnetic ion separating mechanism comprising a beam transmitter and receiver in said tank, and supporting means for said separating mechanism comprising a removable member extending axially of said tank, the top wall of said tank having a removable portion to afford access to the interior of said tank, the top and bottom walls of said tank being of relatively thick material having high magnetic permeability to serve as flux distributing magnet poles.

12. A calutron comprising a vertically disposed, generally cylindrical, fluid-tight tank, means for evacuating said tank, means for establishing a magnetic field longitudinally through said tank, the top and bottom walls of said tank being formed of relatively thick material having a high magnetic permeability so as to act as flux distributing magnet poles, a vertical stanchion in said tank, a plurality of pairs of oppositely radially disposed arms on said stanchion, a cooperating ion beam transmitter and receiver respectively carried by the outer ends of the arms of a pair.

13. A calutron comprising a vertically disposed, generally cylindrical, fluid-tight tank, means for evacuating said tank, means for establishing a magnetic field longitudinally through said tank, the top and bottom walls of said tank being formed of relatively thick material having a high magnetic permeability so as to act as flux distributing magnet poles, a vertical stanchion in said tank, a plurality of pairs of oppositely radially disposed arms on said stanchion, each of said arms carrying an oppositely directed ion beam transmitter and receiver.

14. A calutron comprising a vertically disposed, generally cylindrical, fluid-tight tank, means for evacuating said tank, means for establishing a magnetic field longitudinally through said tank, the top and bottom walls of said tank being formed of relatively thick material having a high magnetic permeability so as to act as flux distributing magnet poles, a vertical stanchion in said tank, a plurality of pairs of oppositely radially disposed arms on said stanchion, a cooperating ion beam transmitter and receiver respectively carried by the outer ends of the arms of a pair, said stanchions being removable vertically and being mounted in a socket provided in the bottom wall of said tank.

15. A calutron comprising a vertically disposed, generally cylindrical, substantially fluid-tight tank, means for evacuating said tank, means for establishing a magnetic field longitudinally through said tank, a plurality of axially spaced ion separating mechanisms in said tank, said mechanisms each comprising a beam transmitter and receiver disposed substantially diametrically apart in said tank, shielding means comprising a segment of a cylinder insulatingly supported from the side wall of said tank and having shelf-like partitions disposed between each adjacent ion separating mechanism.

16. A calutron comprising a vertically disposed, generally cylindrical, substantially fluid-tight tank, means for evacuating said tank, means for establishing a magnetic field longitudinally through said tank, shielding means comprising longitudinally extending spaced-apart segments of cylinders insulatingly supported from the side walls of said tank and provided with shelf-like transverse partitions defining a plurality of ion beam chambers, said segments defining therebetween a narrow diametrically extending slot, a stanchion in said slot extending axially of said tank, a plurality of pairs of oppositely directed radially extending arms positioned in said slot and carried by said stanchion, each pair of arms being in alignment with a pair of said chambers, and an oppositely directed ion beam transmitter and receiver carried adjacent the end of each of said arms.

17. A calutron comprising a vertically disposed, generally cylindrical, substantially fluid-tight tank, means for evacuating said tank, means for establishing a magnetic field longitudinally through said tank, shielding means comprising longitudinally extending spaced-apart segments of cylinders insulatingly supported from the side walls of said tank and provided with shelf-like transverse partitions, defining a plurality of ion beam chambers, said segments defining therebetween a narrow diametrically extending slot, a stanchion in said slot extending axially of said tank, a plurality of pairs of oppositely directed radially extending arms positioned in said slot and carried by said stanchion, each pair of arms being in alignment with a pair of said chambers, an oppositely directed ion beam transmitter and receiver carried adjacent the end of each of said arms, means in the top wall of said tank providing access to the interior thereof, and said stanchion and the structure carried thereby being removable vertically from said tank.

18. A calutron comprising a horizontally disposed, generally cylindrical, substantially fluid-tight tank, means for evacuating said tank, means for establishing a magnetic field longitudinally through said tank, parallel trackways at opposite sides of said tank, carriages on said trackways, electromagnetic ion separating mechanism carried by said carriages comprising an ion beam transmitter carried by a first carriage and a cooperating receiver carried by a second carriage disposed substantially diametrically opposite to said first carriage.

19. A calutron comprising a horizontally disposed, generally cylindrical, substantially fluid-tight tank, means for evacuating said tank, means for establishing a magnetic field longitudinally through said tank, parallel trackways at opposite sides of said tank, carriages on said trackways, electromagnetic ion separating mechanism carried by said carriages comprising a plurality of ion beam transmitters carried by a plurality of carriages on one of said trackways, a corresponding plurality of cooperating receivers carried by a plurality of carriages on said other trackway, said transmitters and receivers being associated in pairs disposed substantially diametrically oppositely to each other.

20. A calutron comprising a horizontally disposed, generally cylindrical, substantially fluid-tight tank, means for evacuating said tank, means for establishing a magnetic field longitudinally through said tank, parallel trackways at opposite sides of said tank, carriages on said trackways, electromagnetic ion separating mechanism carried by said carriages comprising an oppositely directed beam transmitter and receiver carried by a first carriage, a respectively cooperating oppositely disposed receiver and beam transmitter carried by said second carriage disposed substantially diametrically opposite to said first carriage.

21. A calutron comprising a horizontally disposed, generally cylindrical, substantially fluid-tight tank, means for evacuating said tank, means for establishing a magnetic field longitudinally through said tank and comprising relatively thick pole pieces adjacent the ends of said tank, parallel trackways at opposite sides of said tank extending outwardly beyond one end of said tank, carriages on said trackways, electromagnetic ion separating mechanism carried by said carriages, one end wall of said tank and the adjacent pole piece being provided with movable sections affording access to the interior of said tank along said trackways.

22. In a calutron having a generally cylindrical, substantially fluid-tight tank, the combination comprising magnet windings comprising separated coils surrounding said tank, pole forming elements at the ends of said tank, a cylindrical casing of magnetic material disposed surrounding said windings and connecting said pole forming elements to provide a magnetic return path therebetween, and means for cooling said windings comprising conduit means in heat exchange relation to said windings for circulating coolant therein.

23. In a calutron having a generally cylindrical, substantially fluid-tight tank, the combination comprising magnet windings comprising alternated coils and plugs of material having high magnetic permeability surroundings said tank, pole forming elements at the ends of said tank, a cylindrical casing of magnetic material disposed surrounding said windings and connecting said pole forming elements to provide a magnetic return path therebetween and means for cooling said windings comprising conduit means disposed between each adjacent coil and plug member and in heat transfer relation thereto.

24. A calutron comprising an elongated substantially fluid-tight cylindrical tank, magnet windings comprising separated coils surrounding said tank, pole forming elements disposed at the ends of said tank, a cylindrical casing of magnetic material disposed surrounding said windings and connecting said pole forming elements to provide a magnetic return path therebetween, ion separating mechanism comprising a plurality of groups of pairs of ion beam transmitters and receivers removably mounted in said tank, each of said groups comprising a series of pairs spaced apart longitudinally along the length of said tank, the individual transmitter and receiver of each pair being spaced apart transversely of the axis of said tank.

25. A calutron comprising an elongated substantially fluid-tight cylindrical tank, magnet windings comprising alternated coils and plugs of material having high magnetic permeability surrounding said tank, pole forming elements disposed at the ends of said tank, a cylindrical casing of magnetic material disposed surrounding said windings and connecting said pole forming elements to provide a magnetic return path therebetween, electromagnetic ion separating mechanism comprising a plurality of pairs of ion beam transmitters and receivers, and support means attached to said mechanism for removably disposing said transmitters and receivers within said tank.

References Cited in the file of this patent

UNITED STATES PATENTS

| | | |
|---|---|---|
| 1,143,305 | Nichols | June 15, 1915 |
| 1,629,171 | Mavrogenis | May 17, 1927 |
| 1,916,408 | Bol | July 4, 1933 |
| 2,112,822 | Braden | Apr. 5, 1938 |
| 2,150,800 | Jordan | Mar. 14, 1939 |
| 2,221,467 | Bleakney | Nov. 12, 1940 |
| 2,331,189 | Hipple | Oct. 5, 1943 |
| 2,345,115 | Hall | Mar. 28, 1944 |

FOREIGN PATENTS

| | | |
|---|---|---|
| 111,162 | Austria | Nov. 10, 1928 |

OTHER REFERENCES

Jordan et al.: Journal of Applied Physics, vol. 13, September 1942, pp. 526–538, pp. 530–532 relied on.